US006458490B1

(12) United States Patent
Hommura et al.

(10) Patent No.: US 6,458,490 B1
(45) Date of Patent: Oct. 1, 2002

(54) NONAQUEOUS ELECTROLYTE BATTERY

(75) Inventors: Hayato Hommura; Hiroshi Imoto; Masayuki Nagamine, all of Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/598,307

(22) Filed: Jun. 21, 2000

(30) Foreign Application Priority Data

Jun. 22, 1999 (JP) .......................................... 11-176007

(51) Int. Cl.[7] .............................. H01M 4/58; H01M 2/16
(52) U.S. Cl. ..................... 429/231.1; 429/247; 429/129; 429/224
(58) Field of Search .............................. 429/231.1, 224, 429/129, 145, 247, 249, 255

(56) References Cited

U.S. PATENT DOCUMENTS

| 5,626,981 A | 5/1997 | Bernard Simon et al. .. 429/105 |
| 5,654,114 A | * 8/1997 | Kubota et al. ............... 429/218 |
| 6,156,459 A | * 12/2000 | Negoro et al. ............... 429/322 |

FOREIGN PATENT DOCUMENTS

| JP | 0548449 A1 | 6/1993 | .......... H01M/10/40 |
| JP | 07220756 | 8/1995 | .......... H01M/10/40 |
| JP | 11067266 | 3/1999 | .......... H01M/10/40 |
| JP | 11260401 | 9/1999 | .......... H01M/10/40 |

OTHER PUBLICATIONS

C. Jehoulet, et al., "Influence of the Solvent Composition on the Passivation Mechanism of the Carbon Electrode in Lithium–ion Prismatic Cells," CA Conference Article, Proceedings of the Symposium on Batteries for Portable Applications and Electric Vehicles, Proceedings of the Symposium on Batteries for Portable Applications and Electric Vehicles, Paris, France, Aug. 31 to Sep. 5, 1997.

* cited by examiner

Primary Examiner—Stephen Kalafut
Assistant Examiner—Raymond Alejandro
(74) Attorney, Agent, or Firm—Sonnenschein, Nath & Rosenthal

(57) ABSTRACT

A nonaqueous electrolyte secondary battery incorporating a positive electrode containing a positive-electrode active material and a negative electrode containing a negative-electrode active material which are laminated through a separator and containing nonaqueous electrolytic solution enclosed therein, the nonaqueous electrolyte secondary battery having a spinel manganese composite metal oxide serving as the positive-electrode active material, wherein the separator is constituted by paper having a thickness of 15 $\mu$m to 60 $\mu$m and permeability of 1 second/100 cc to 10 seconds/100 cc.

14 Claims, 1 Drawing Sheet

NONAQUEOUS ELECTROLYTE BATTERY

RELATED APPLICATION DATA

The present application claims priority to Japanese Application No. P11-176007 filed Jun. 22, 1999 which application is incorporated herein by reference to the extent permitted by law.

BACKGROUND OF THE INVENTION

1. Field of the Invention

The present invention relates to a nonaqueous electrolyte secondary battery incorporating a positive-electrode active material, a separator, a negative-electrode active material and an electrolytic solution.

2. Description of the Related Art

A nonaqueous electrolyte secondary battery capable of enduring heavy load discharge and thus permitted to repeatedly be used owing to charge has widely been used as a power source for a variety of portable electronic apparatus pieces. Since reduction in the size and weight of the electronic apparatus has been realized, also the nonaqueous electrolyte secondary battery which is the power source for the portable electronic apparatus has been required to have reduced size and weight and a high energy density.

In particular, a lithium ion secondary battery has been employed as the nonaqueous electrolyte secondary battery which is capable of satisfying the foregoing requirements.

As a material which can be used as the positive-electrode active material of a 4-volt lithium ion secondary battery, a lithium-cobalt oxide, a lithium-nickel oxide and a lithium-manganese oxide are known materials. From a viewpoint of realizing safety and obtaining a high energy density, a lithium-cobalt oxide is a preferred material.

A separator for a nonaqueous electrolyte secondary battery, such as the lithium-ion battery, is constitutes by a polyolefin small-pore film represented by polymer polyethylene and polymer polypropylene. A primary battery frequently incorporates a separator containing cellulose, such as paper or unwoven fabric.

A small-pore polyolefin battery having proper gas permeability is melted when the internal temperature of the battery is heated to about 120° C. to about 170° C. Thus, pores in the small pores are closed. As a result, a shutdown effect occurs with which movement of lithium ions is blocked and any electric current flows. The shutdown effect is used as a safety means to prevent flow of any excess current caused from runaway of chemical reactions in the battery.

The lithium-cobalt oxide which is employed as the positive-electrode active material of the lithium-ion secondary battery suffers from a problem in that the places of origin of cobalt are limited and cost of cobalt, which is rare metal, is instable.

The small-pore polyolefin film for use in the separator of the nonaqueous electrolyte secondary battery which requires a complicated manufacturing process encounters a problem in that the cost cannot be reduced.

The temperature at which oxygen is discharged from the lithium-cobalt oxide is lower than that of a spinel lithium-manganese composite metal oxide by about 130° C. Therefore, there is apprehension that the small-pore polyolefin film is melted and discharged when the temperature of the battery has been raised to a level higher than 130° C. in a case where the temperature of the battery is raised owing to preservation at high temperatures or external short circuit. In the foregoing case, physical contact between the positive electrode and the negative electrode sometimes causes short circuit to occur.

The characteristics of the separator of the nonaqueous electrolyte secondary battery as the film greatly concern the characteristics of the battery. The characteristics as the film can be expressed by the film thickness and the permeability. The "permeability" is a degree of air penetration of paper. That is, the degree is expressed by time required for air in a predetermined quantity (assumed to be 100 cc) to pass through a test piece under predetermined condition, the time being expressed by seconds. Therefore, air quickly passes through the film as the foregoing value is reduced. Thus, the pressure which is applied to the film is lowered. In the foregoing case, the permeability is enlarged. As the value is enlarged, penetration of air takes a long time, causing the pressure which is applied to the film to be raised. Thus, the permeability is reduced.

In general, the characteristics of the battery is improved as the film thickness is reduced and the permeability is enlarged. A separator having a great permeability has a low resistance thereof, causing the characteristics of the battery required when a high load to be improved. On the other hand, a frequency of occurrence of short circuits is raised undesirably, causing the manufacturing yield to deteriorate. A separator having small permeability is caused to have high resistance. As a result, there arises a problem in that the battery cannot be operated.

SUMMARY OF THE INVENTION

In view of the foregoing, an object of the present invention is to provide a nonaqueous electrolyte secondary battery incorporating a positive-electrode active material and a separator which are made of materials which are relatively easily available and exhibiting excellent heat resistance and satisfactory characteristics as the battery.

To achieve the foregoing object, according to one aspect of the present invention, there is provide a nonaqueous electrolyte secondary battery incorporating a positive electrode containing a positive-electrode active material and a negative electrode containing a negative-electrode active material which are laminated through a separator and containing nonaqueous electrolytic solution enclosed therein, the nonaqueous electrolyte secondary battery including: a spinel manganese composite metal oxide serving as the positive-electrode active material, wherein the separator is constituted by paper having a thickness of 15 $\mu$m to 60 $\mu$m and permeability of 1 second/100 cc to 10 seconds/100 cc.

The nonaqueous electrolyte secondary battery according to the present invention incorporates the spinel manganese composite metal oxide serving as the positive-electrode active material. The spinel manganese composite metal oxide barely contains cobalt, which is rare metal, so that it is readily available and advantages of manufacturing cost.

Furthermore, the spinel manganese composite metal oxide discharges oxygen at a temperature which is higher than that of the lithium-cobalt composite metal oxide by about 130° C. Therefore, any shutdown function is required. As a result, a paper separator can be employed.

Paper can be manufactured without any complicated manufacturing process required for a small-pore polyolefin film. Moreover, paper exhibits excellent heat resistance. When the thickness and the permeability of paper are properly determined, characteristics of the battery required in a case of a high load can be maintained. Moreover, unintentional short circuit can be prevented.

Other objects, features and advantages of the invention will be evident from the following detailed description of the preferred embodiments described in conjunction with the attached drawings.

DETAILED DESCRIPTION OF PREFERRED EMBODIMENTS

Figure 1:
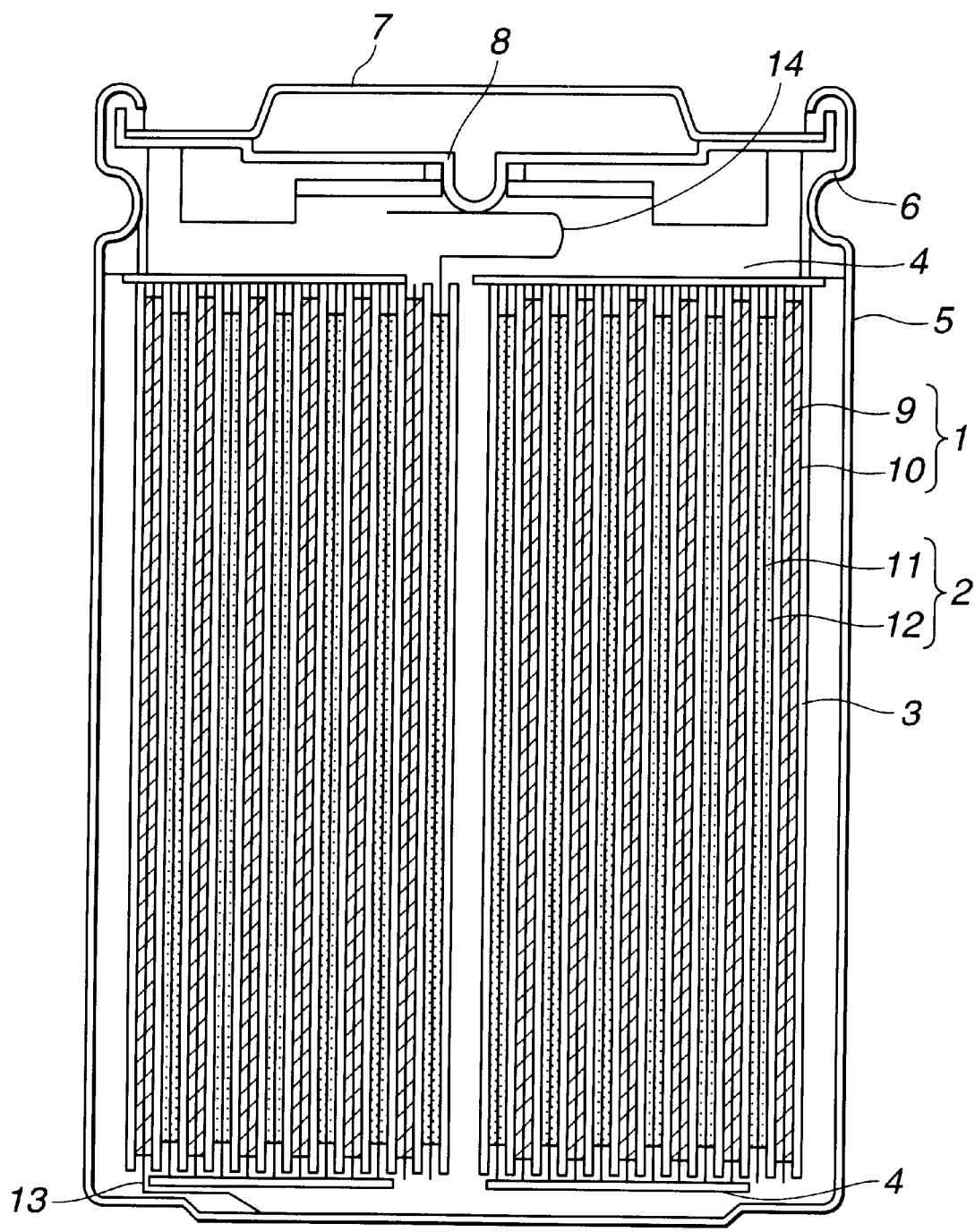
FIG. 1 is a schematic cross sectional view showing an essential portion of a basic structure of a nonaqueous electrolyte secondary battery according to the present invention.

A nonaqueous electrolyte secondary battery according to the present invention will now be described with reference to the drawings.

FIG. 1 is a diagram showing the basic structure of a cylindrical nonaqueous electrolyte secondary battery. The cylindrical nonaqueous electrolyte secondary battery incorporates, for example, an elongated negative electrode 1 and an elongated positive electrode 2 which are laminated through a separator 3. Then, the laminate is wound many times so that a spiral electrode is formed which is accommodate in an iron battery can 5 applied with nickel plating. Then, nonaqueous electrolytic solution is enclosed.

The elongated negative electrode 1 incorporates a negative-electrode collector 9 which have two sides on each of which an active material layer 10 containing a negative-electrode active material is formed. Similarly, the elongated positive electrode 2 incorporates a positive-electrode collector 11 which have two sides on each of which an active material layer 12 containing a positive-electrode active material is formed.

The spiral electrode has upper and lower end surfaces each of which is provided with a disc-like insulating plate 4 so that unintentional contact between the elongated negative electrode 1 or the elongated positive electrode 2 with the battery can 5 or the like.

The battery can 5 is hermetically closed by a battery cover 7 through an insulating and closing gasket 6 having the surface coated with asphalt. The battery cover 7 is provided with a safety valve unit 8 which has a current blocking mechanism. When the internal resistance has been raised, the safety valve unit 8 is quickly opened.

A negative-electrode lead 13 constituted by nickel is extended from the negative-electrode collector 9, the negative-electrode lead 13 having an end welded to the inner wall of the battery can 5. Similarly, a positive-electrode lead 14 constituted by aluminum is extended from the positive-electrode collector 11, the positive-electrode lead 14 having an end welded to the safety valve unit 8. The positive-electrode lead 14 is electrically connected to the battery cover 7 through the safety valve unit 8. Therefore, the battery can 5 serves as the negative electrode and the battery cover 7 serves as the positive electrode.

The negative-electrode active material of the elongated negative electrode 1 of the cylindrical nonaqueous electrolyte secondary battery having the above-mentioned structure may contain at least one type of materials selected from a group consisting of metal, such as Li, a lithium alloy, such as LiAl, a conductive polymer, such as polyacethylene or poly-P-phenylene, a metal oxide, such as $LiFe_2O_2$, and carbonaceous material.

The positive-electrode active material of the elongated positive electrode 2 according to the present invention is a spinel manganese composite metal oxide.

The spine manganese composite metal oxide is expressed by $Li[Mn_{(2-x-y)}Li_xM_y]O_4$. Note that M of $Li[Mn_{(2-x-y)}Li_xM_y]O_4$ is at least one type of element selected from a group consisting of B, Mg, Ca, Sr, Ba, Ti, V, Cr, Fe, Co, Ni, Cu, Al, Sn, Sb, In, Nb, Mo, W, Y, Ru and Rh. Moreover, relationships $0 \leq x \leq 1$ and $0 \leq y \leq 0.4$ are satisfied.

The temperature at which the spinel manganese composite metal oxide discharges oxygen is higher than that of the conventional lithium-cobalt metal oxide by about 130° C. Therefore, satisfactory stability can be realized when the temperature of the battery is raised in a case where preservation is performed at a high temperature or short circuit has occurred.

When the spinel manganese composite metal oxide is employed as the positive-electrode active material, the shutdown function of the separator is not required. Therefore, paper which did not have the shutdown effect may be employed as the separator. When paper is employed as the separator, the heat resistance of the separator can be improved. Moreover, the apprehension of melting and discharge of the separator can be eliminated. As a result, the thickness of the separator can be reduced.

Therefore, the cylindrical nonaqueous electrolyte secondary battery may be structured such that paper is employed to constitute the separator 3.

The raw material of paper for constituting the separator 3 is exemplified by natural cellulose, regenerated cellulose or their mixture.

It is preferable that the thickness of paper for constituting the separator 3 is 15 μm to 60 μm, more preferably 15 μm to 50 μm, as a value shutdown by a method conforming JIS C2301 or JIS K7130. When the thickness of the paper for constituting the separator 3 is smaller than 15 μm. a problem of occurrence of short circuit arises. When the thickness is larger than 60 μm, the ratio of occupation of the separator 3 in the battery can is raised excessively. Therefore, the capacity is undesirably reduced.

It is preferable that paper for constituting the separator 3 has proper permeability. It is preferable that the permeability is 1 second/100 cc to 10 seconds/100 cc as a value measured by a method conforming JIS K7126. As the value is reduced, the permeability is raised. As the value is enlarged, the permeability is lowered. When the permeability is too low, that is, when the foregoing value is higher than 10 seconds/100 cc, the resistance of the film is raised excessively. As a result, the characteristics of the battery required in a case of a high load deteriorates. When the permeability is too high, that is, when the foregoing value is lower than one second/100 cc, short circuit easily occurs. Thus, the manufacturing yield deteriorates.

It is preferable that the ignition point of paper for constituting the separator 3 is 200° C. or higher. When the ignition point of paper is lower than 200° C., satisfactory heat resistance cannot be obtained.

According to the type of cellulose which is the raw material of the separator 3, surface treatment for improving permeability of electrolyte ions may be performed by using chemicals, such as surface active agent. To improve resistance against electrolytic solution of cellulose which is the raw material of the separator 3, surface treatment may be performed.

The cylindrical nonaqueous electrolyte secondary battery incorporates the nonaqueous electrolytic solution which is prepared by dissolving lithium salt which is the electrolytic solution in organic solvent.

The electrolyte may be a material which contains at least one type of the foregoing lithium salt: $LiClO_4$, $LiPF_6$, LiAsF$_6$, LiBF$_4$, CH$_3$SO$_3$Li, CF$_3$SO$_3$Li and (CF$_3$SO$_2$)$_2$NLi. A mixture of the foregoing materials may be employed.

The organic solvent must contain at least one type of the following materials: propylene carbonate, ethylene carbonate, dimethyl carbonate, diethyl carbonate, methylethyl carbonate, 1,2-dimethoxyethane, 1,2-diethoxyethane, γ-butylolactone, tetrahydrofuran, 2-methyltetrahydrofuran, 1,3-dioxlane, sulfolane, methylsulfolane, acetonitrile, methylformate, ethylformate, ethylacetate and methylacetate. Note that mixture of the foregoing materials may be employed.

EXAMPLES

Examples of the present invention will now be described. Note that the present invention is not limited to the following examples.

Example 1

The elongated negative electrode was manufactured as follows.

Initially, 90 parts by weight of non-graphitizable carbon material and 10 parts by weight of polyvinylidene fluoride were mixed so that a negative-electrode mix was prepared. The negative-electrode mix was dispersed in N-methylpyrolidone so that a slurry coating solution for the negative electrode was prepared.

Copper foil having a thickness of 15 μm was employed to constitute the negative-electrode collector. The slurry coating solution for the negative electrode was uniformly applied to the two sides of the negative-electrode collector. Then, the negative-electrode collector was dried, and then compression and molding were performed under a pressure. Thus, the elongated negative electrode was manufactured.

The elongated positive electrode was manufactured as follows.

Initially, 85 parts by weight of spinel manganese composite metal oxide expressed by composition formula LiMn$_2$O$_4$, 10 parts by weight of graphite and 5 parts by weight of polyvinylidene fluoride were mixed so that the positive-electrode mix was prepared. The positive-electrode mix was dispersed in N-methylpyrolidone so that a slurry coating solution for the positive electrode was prepared.

Aluminum foil having a thickness of 20 μm was employed as the positive-electrode collector was employed. The slurry coating solution for the positive electrode was uniformly applied to the two sides of the positive-electrode collector. Then, the positive-electrode collector was dried, and then compression and molding were performed under a predetermined pressure. Thus, the elongated positive electrode was manufactured.

The separator was constituted by regenerated cellulose as the raw material. Paper having a thickness of 15 μm, the permeability of 3 seconds/100 cc and an ignition point of 230° C. was employed.

As the nonaqueous solvent for constituting the electrolytic solution, a mixed solvent of propylene carbonate and dimethyl carbonate in the same quantities was employed. As the electrolyte, LiPF$_6$ was employed. The rate at which LiPF$_6$ was dissolved at the mixed solvent at the same quantity was 1 mol/L.

The elongated negative electrode, the elongated positive electrode and the separator were laminated in the order as the elongated negative electrode, the separator, the elongated positive electrode and the separator. Thus, a cylindrical nonaqueous electrolyte secondary battery having a diameter of 18 mm and a height of 65 mm was manufactured.

Example 2

A cylindrical nonaqueous electrolyte secondary battery having a structure similar to that according to Example 1 was manufactured except for the separator constituted by paper, the raw material of which was regenerated cellulose and which had a thickness of 20 μm, a permeability of 4 seconds/100 cc and an ignition point of 230° C.

Example 3

A cylindrical nonaqueous electrolyte secondary battery having a structure similar to that according to Example 1 was manufactured except for the separator constituted by paper, the raw material of which was regenerated cellulose and which had a thickness of 31 μm, a permeability of 6 seconds/100 cc and an ignition point of 230° C.

Comparative Example 1

A cylindrical nonaqueous electrolyte secondary battery having a structure similar to that according to Example 1 was manufactured except for the separator constituted by small-pore polyethylene film having a thickness of 30 μm and a permeability of 560 seconds/100 cc.

Comparative Example 2

A cylindrical nonaqueous electrolyte secondary battery having a structure similar to that according to Example 1 was manufactured except for the separator constituted by small-pore polypropylene film having a thickness of 26 μm and a permeability of 630 seconds/100 cc.

Comparative Example 3

A cylindrical nonaqueous electrolyte secondary battery having a structure similar to that according to Example 1 was manufactured except for the separator constituted by paper, the raw material of which was regenerated cellulose and which had a thickness of 10 μm, a permeability of 2 seconds/100 cc and an ignition point of 230° C.

Comparative Example 4

A cylindrical nonaqueous electrolyte secondary battery having a structure similar to that according to Example 1 was manufactured except for the separator constituted by paper, the raw material of which was regenerated cellulose and which had a thickness of 70 μm, a permeability of 13 seconds/100 cc and an ignition point of 230° C.

Comparative Example 5

A cylindrical nonaqueous electrolyte secondary battery having a structure similar to that according to Example 1 was manufactured except for the positive-electrode active material constituted by spinel manganese composite metal oxide expressed by composition formula LiCoO$_2$ as a substitute for the spinel manganese composite metal oxide expressed by composition formula LiMn$_2$O$_4$ and the separator constituted by paper, the raw material of which was regenerated cellulose and which had a thickness of 31 μm, a permeability of 6 seconds/100 cc and an ignition point of 230° C.

The cylindrical nonaqueous electrolyte secondary batteries manufactured as described above were evaluated by the following method. Results were shown in Table 1.

The load characteristic of each battery was expressed by a rate (the capacity of the battery realized when the battery was discharged at 3 C.)/(the capacity of the battery realized when the battery was discharge at 0.3 C.), the rate being expressed by percentage.

The occurrence rate of short circuits was measured such that the elongated negative electrode, the elongated positive electrode and the separator were laminated. Then, occurrence of electric conduction between the negative-electrode lead and the positive-electrode lead allowed to extend from the negative-electrode and positive-electrode collectors was determined by performing measurement using an insulation resistance tester conforming to JIS C1302. Batteries encountered the electric conduction were evaluated as those suffering from defective insulation. The ratio of occurrence of the defective insulation was indicated by (the number of defective batteries)/(the total number of the measured batteries).

A high-temperature test was performed such that each cylindrical nonaqueous electrolyte secondary battery was, for 10 minutes, allowed to stand in an oven set to 200° C. Then, a method similar to that employed to measure the ratio of occurrence of short circuits was employed to perform the measurement. The ratio of occurrence of defective insulation of the separator was indicated by (the number of defective batteries)/(the total number of the measured batteries).

TABLE 1

|  | Positive-Electrode Active Material | Material of Separator | Thickness of Separator ($\mu$m) |
| --- | --- | --- | --- |
| Example 1 | $LiMn_2O_4$ | paper | 15 |
| Example 2 | $LiMn_2O_4$ | paper | 20 |
| Example 3 | $LiMn_2O_4$ | paper | 31 |
| Comparative Example 1 | $LiMn_2O_4$ | polyethylene | 30 |
| Comparative Example 2 | $LiMn_2O_4$ | polypropylene | 26 |
| Comparative Example 3 | $LiMn_2O_4$ | paper | 10 |
| Comparative Example 4 | $LIMn_2O_4$ | paper | 70 |
| Comparative Example 5 | $LiCoO_2$ | paper | 31 |

|  | Permeability (sec/100 cc) | Ignition Point (° C.) | Capacity of Battery (mAh) |
| --- | --- | --- | --- |
| Example 1 | 3 | 230 | 1350 |
| Example 2 | 4 | 230 | 1300 |
| Example 3 | 6 | 230 | 1200 |
| Comparative Example 1 | 560 | — | 1200 |
| Comparative Example 2 | 630 | — | 1250 |
| Comparative Example 3 | 2 | 230 | 1400 |
| Comparative Example 4 | 13 | 230 | 1000 |
| Comparative Example 5 | 6 | 230 | 1200 |

|  | Load Characteristic (%) | Short Circuit Ratio | Short Circuit Ratio after High-Temperature Test |
| --- | --- | --- | --- |
| Example 1 | 91 | 0/100 | 0/10 |
| Example 2 | 91 | 0/100 | 0/10 |
| Example 3 | 90 | 0/100 | 0/10 |
| Comparative Example 1 | 81 | 0/100 | 10/10 |
| Comparative Example 2 | 79 | 0/100 | 10/10 |
| Comparative Example 3 | 91 | 12/100 | 0/10 |
| Comparative Example 4 | 87 | 0/100 | 0/10 |
| Comparative Example 5 | 85 | 0/100 | 4/10 |

As can be understood from the results shown in Table 1, the separator according to the present invention, the raw material of which was cellulose had the improved load characteristics and the ratio of occurrence of short circuits after the high-temperature test as compared with the conventional small-pore polyethylene film and the small-pore polypropylene film according to Comparative Examples 1 and 2.

As compared with the thin separator according to Comparative Example 3 and the thick separator according to Comparative Example 4, the ratio of occurrence of short circuits, the capacity of the battery and the load characteristic were improved.

The positive-electrode active material incorporating the spinel manganese composite metal oxide according to the present invention had the improved ratio of occurrence of short circuits after the high-temperature test as compared with the conventional lithium-cobalt composite metal oxide according to the comparative Example 5.

As can be understood from the results, the nonaqueous electrolyte secondary battery according to the present invention incorporates the separator constituted by paper which is free from any apprehension of melting and discharge. Thus, satisfactory heat resistance and characteristics as the battery can be obtained. Since the spinel manganese composite metal oxide is employed as the material for the positive-electrode active material, the heavy load discharge characteristic can be improved.

Since the positive-electrode active material and the separator according to the present invention are employed, the nonaqueous electrolyte secondary battery excellent in the safety characteristics including the heat resistance and having satisfactory heavy load discharge characteristic can be provided at a low cost.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A nonaqueous electrolyte secondary battery incorporating a positive electrode containing a positive-electrode active material and a negative electrode containing a negative-electrode active material which are laminated through a separator and containing nonaqueous electrolytic solution enclosed therein, the nonaqueous electrolyte secondary battery comprising:

a spinel manganese composite metal oxide serving as the positive-electrode active material, wherein the separator is constituted by paper having a thickness of 15 μm to 60 μm and permeability of 1 second/100 cc to 10 seconds/100 cc; and the separator has an ignition point of at least 200 deg. C.

2. A nonaqueous electrolyte secondary battery according to claim 1, wherein the paper is constituted by natural cellulose, regenerated cellulose or mixture thereof.

3. A nonaqueous electrolyte secondary battery according to claim 1, wherein the spinel manganese composite metal oxide is $Li(Mn_{(2-x-y)}Li_xM_y)O_4$ where M is at least one element selected from a group consisting of B, Mg, Ca, Sr, Ba, Ti, V, Cr, Fe, Co, Ni, Cu, Al, Sn, Sb, In, Nb, Mo, W, Y, Ru and Rh and relationships $0 \leq x \leq 1$ and $0 \leq y \leq 0.4$ are satisfied.

4. A nonaqueous electrolyte secondary battery according to claim 1, wherein the negative-electrode active material contains at least one material selected from lithium, a lithium alloy, a conductive polymer material, a metal oxide and a carbonaceous material.

5. A nonaqueous electrolyte secondary battery according to claim 1, wherein the nonaqueous electrolytic solution is prepared by dissolving lithium salt in an organic solvent, the lithium salt being an electrolyte.

6. A nonaqueous electrolyte secondary battery according to claim 5, wherein the electrolyte is at least one material selected from a group consisting of $LiClO_4$, $LiPF_6$, $LiAsF6$, $LiBF_4$, $CH_3SO_3Li$, $CF_3SO_3Li$ and $(CF_3SO_2)_2NLi$.

7. A nonaqueous electrolyte secondary battery according to claim 5, wherein the organic solvent is at least one material selected from a group consisting of propylene carbonate, ethylene carbonate, dimethyl carbonate, diethyl carbonate, methylethyl carbonate, 1,2-dimethoxyethane, 1,2-diethoxyethane, γ-butyrolactone, tetrahydrofuran, 2-methyltetrahydrofuran, 1,3-dioxlane, sulfolane, methylsulfolane, acetonitrile, methylformate, ethylformate, ethylacetate and methylacetate.

8. A nonaqueous electrolyte secondary battery comprising: a positive electrode containing a positive-electrode active material formed on each of two sides of a positive-electrode collector and a negative electrode containing a negative-electrode active material formed on each of the two sides of a negative-electrode collector which are laminated at least once through a separator; and an enclosed nonaqueous electrolytic solution, wherein a spinel manganese composite metal oxide is contained as the positive-electrode active material, and the separator is constituted by paper having a thickness of 15 μm to 60 μm and a permeability of 1 second/100 cc to 10 seconds/100 cc; and wherein the separator has an ignition point of at least 200 deg. C.

9. A nonaqueous electrolyte secondary battery according to claim 8, wherein the paper is constituted by natural cellulose, regenerated cellulose or mixture thereof.

10. A nonaqueous electrolyte secondary battery according to claim 8, wherein the spinel manganese composite metal oxide is $Li(Mn_{(2-x-y)}Li_xM_y)O_4$ where M is at least one element selected from a group consisting of B, Mg, Ca, Sr, Ba, Ti, V, Cr, Fe, Co, Ni, Cu, Al, Sn, Sb, In, Nb, Mo, W, Y, Ru and Rh and relationships $0 \leq x \leq 1$ and $0 \leq y \leq 0.4$ are satisfied.

11. A nonaqueous electrolyte secondary battery according to claim 8, wherein the negative-electrode active material contains at least one material selected from lithium, a lithium alloy, a conductive polymer material, a metal oxide and a carbonaceous material.

12. A nonaqueous electrolyte secondary battery according to claim 8, wherein the nonaqueous electrolytic solution is prepared by dissolving lithium salt in an organic solvent, the lithium salt being an electrolyte.

13. A nonaqueous electrolyte secondary battery according to claim 12, wherein the electrolyte is at least one material selected from a group consisting of $LiClO_4$, $LiPF_6$, $LiAsF_6$, $LiBF_4$, $CH_3SO_3Li$, $CF_3SO_3Li$ and $(CF_3SO_2)_2NLi$.

14. A nonaqueous electrolyte secondary battery according to claim 12, wherein the organic solvent is at least one material selected from a group consisting of propylene carbonate, ethylene carbonate, dimethyl carbonate, diethyl carbonate, methylethyl carbonate, 1,2-dimethoxyethane, 1,2-diethoxyethane, γ-butyrolactone, tetrahydrofuran, 2-methyltetrahydrofuran, 1,3-dioxlane, sulfolane, methylsulfolane, acetonitrile, methylformate, ethylformate, ethylacetate and methylacetate.

\* \* \* \* \*